(12) United States Patent
Wilkes

(10) Patent No.: US 7,055,395 B2
(45) Date of Patent: Jun. 6, 2006

(54) SULFUR DEPOSITION CONTROL METHOD AND RELATED CONTROL ALGORITHM

(75) Inventor: Colin Wilkes, Delanson, NY (US)

(73) Assignee: General Electric Company, Schenectady, NY (US)

( * ) Notice: Subject to any disclaimer, the term of this patent is extended or adjusted under 35 U.S.C. 154(b) by 403 days.

(21) Appl. No.: 10/219,331

(22) Filed: Aug. 16, 2002

(65) Prior Publication Data

US 2004/0031268 A1 Feb. 19, 2004

(51) Int. Cl.
*G01F 1/00* (2006.01)

(52) U.S. Cl. .................. 73/861; 60/772; 423/574.1
(58) Field of Classification Search ............. 73/861; 60/772; 423/574.1
See application file for complete search history.

(56) References Cited

U.S. PATENT DOCUMENTS

| | | | |
|---|---|---|---|
| 3,758,676 A | * | 9/1973 | Goddin et al. ............ 423/576 |
| 4,042,340 A | * | 8/1977 | Palm ....................... 422/198 |
| 4,822,591 A | * | 4/1989 | Reed et al. ............. 423/574.1 |
| 6,652,826 B1 | * | 11/2003 | Chowdhury et al. ..... 423/573.1 |

OTHER PUBLICATIONS

Chesnoy et al: "$S_8$ Threatens Natural Gas Operations, Environment," *Oil & Gas Journal*, Apr. 28, 1997, Technology: Gas Processing.
Pack et al: Formation of Elemental Sulphur In Natural Gas Transmission Pipelines, *Technical Article*.
Wilkes et al: Sulfur Deposition in a Gas Turbine Natural Gas Fuel Control System, published in the Proceedings of the International Joint Power Generation Conference, San Francisco, Jul. 1999, pp. 1–8.

* cited by examiner

*Primary Examiner*—Harshad Patel
(74) *Attorney, Agent, or Firm*—Nixon & Vanderhye P.C.

(57) ABSTRACT

A method for detecting and controlling the elemental sulfur deposition on pressure reducing gas fuel control valves in cases where the sulfur deposition results from a temperature drop during expansion across the control valve, such as that encountered in gas turbine engines. The control method and algorithm according to the invention uses measured parameters of gas flow rate, pressure and temperature, combined with known pressure reducing valve characteristics to first determine whether sulfur deposition has occurred, and thereafter to calculate a valve position control parameter used to control the gas temperature upstream of the control valve, thereby maintaining the sulfur in a vapor phase through the pressure reducing process and preventing subsequent sulfur deposition on the valve and downstream piping.

6 Claims, 4 Drawing Sheets

Fig. 1 Uncontrolled sulfur deposit formation

Fig. 2 Typical example showing no sulfur deposition with heated gas

SULFUR DEPOSITION CONTROL METHOD AND RELATED CONTROL ALGORITHM

The present invention relates to a method for detecting and controlling elemental sulfur deposition on pressure reducing gas fuel control valves. In particular, the invention relates to the development of a new control algorithm that can be used to reduce the amount of sulfur deposition in the gas fuel control valves on gas turbine engines that are used, for example, in the generation of electricity. The control algorithm can also be used in non-turbine applications where sulfur deposition results from a temperature drop during vapor expansion analogous to that encountered in gas turbine engines.

The control method and algorithm according to the invention uses known parameters of gas flow rate, pressure and temperature combined with known pressure reducing valve characteristics to determine whether sulfur deposition has taken place. Once the fact of sulfur deposition is confirmed, a control signal is passed to an electrical (or equivalent) gas heater to raise the gas temperature upstream of the control valve. Raising the gas temperature to a higher level serves to maintain the elemental sulfur in a vapor phase through the pressure reducing process and thereby prevent subsequent sulfur deposition. The control algorithm in accordance with the invention can thus be used to effectively monitor and adjust the operating parameters of control valves using conventional feedback control techniques, thereby minimizing the energy required to prevent sulfur deposition over extended periods of time.

Elemental sulfur deposition in gas fuel systems is relatively rare, but known to occur. In the case of gas turbine engines, the deposition normally takes place downstream of the gas control valves ("GCV") which reduce the incoming pressure to that required at the inlet to gas fuel injections systems. The required pressure downstream of the GCV's typically varies with turbine load. Thus, the inlet to the GCV is normally maintained at a constant level by a single stop ratio valve ("SRV"). Normally, the pressure drop across the GCV's is maintained such that the valves operate in the critical flow regime known as "choked flow." The pressure drop across the SRV is significantly less and does not vary with load, provided the inlet supply pressure remains constant (which is normally the case).

In prior art gas turbine systems, significant elemental sulfur deposits have been observed at the throat and downstream of the GCV's when normal gas turbine operations are interrupted. As the deposits build, the GCV's automatically open in order to maintain the downstream pressure. Eventually, the GCV's exceed the desired operating range, typically 90% open. If the deposits are allowed to continue, the valves eventually reach 100% open and further deposition results in a reduction in turbine load capacity, as well as unwanted changes in gas combustion and a loss of gas emission compliance. As a temporary solution, gas turbine plant operators periodically switch over to liquid fuel and back to gas fuel (for example, every ten days). Gas turbine operation on liquid fuel causes the GCV's to fully close and at least some pieces of the deposited sulfur can be broken loose. Upon returning the operation to gas fuel, the loose sulfur is transported to the fuel nozzles and burned in the combustor.

This conventional solution to sulfur deposition can be unreliable, however, and has resulted in fuel nozzle plugging and hardware damage. On a long term basis, layers of sulfur can also be deposited in the downstream gas manifold piping. Thus, the piping eventually must be cleaned. Such cleaning operations are labor intensive requiring several days of forced outage of the gas turbine and significant loss of income to the end user.

The very low concentration of elemental sulfur vapor contained in the incoming gas feed, typically 20–30 parts per billion by weight (ppbw), make it impractical for plant operators to impose stringent fuel specifications on gas suppliers to completely eliminate the presence of sulfur in the feed gas. Concentrations of such small magnitude cannot be measured by commercially available equipment. The gas turbine operator is therefore required to take corrective action to prevent deposits from forming in the first place. The present invention facilitates that corrective function using a new valve control algorithm while minimizing the energy consumption required to eliminate unwanted sulfur deposits.

The sulfur deposition problem described above is relatively rare. Only one known article in the literature has discussed the problem in detail. A 1997 article by Chesnoy, Andre-Bernard and Pack, David J., "S8 Threatens Natural Gas Operations, Environment," Oil & Gas Journal, Apr. 28, 1997 suggests a cause, but does not propose a solution to the deposition problem.

BRIEF DESCRIPTION OF THE INVENTION

The present invention addresses the sulfur deposition problems identified in the prior art by preventing the formation of sulfur deposits in pressure reducing valves in both the valve throat and in downstream valves and piping. The invention achieves that objective in conventional gas processing systems using a unique gas control algorithm. Upon implementation, the algorithm eliminates the need for forced outages required to clean gas processing equipment at the deposit site. The method according to the invention also prevents sulfur deposition with a minimum required energy usage or loss of efficiency of the gas turbine.

The basic principal used to control the sulfur deposit is similar to that for preventing condensation of moisture in a humid atmosphere. By maintaining surface temperatures above the gas dew point, condensation can be substantially reduced or eliminated. Similarly, by maintaining the gas temperature above the sulfur solubility temperature, sulfur remains in solution in the gas phase and will not form deposits. Heretofore, the algorithm for achieving those controls has not been known.

Figure 1:
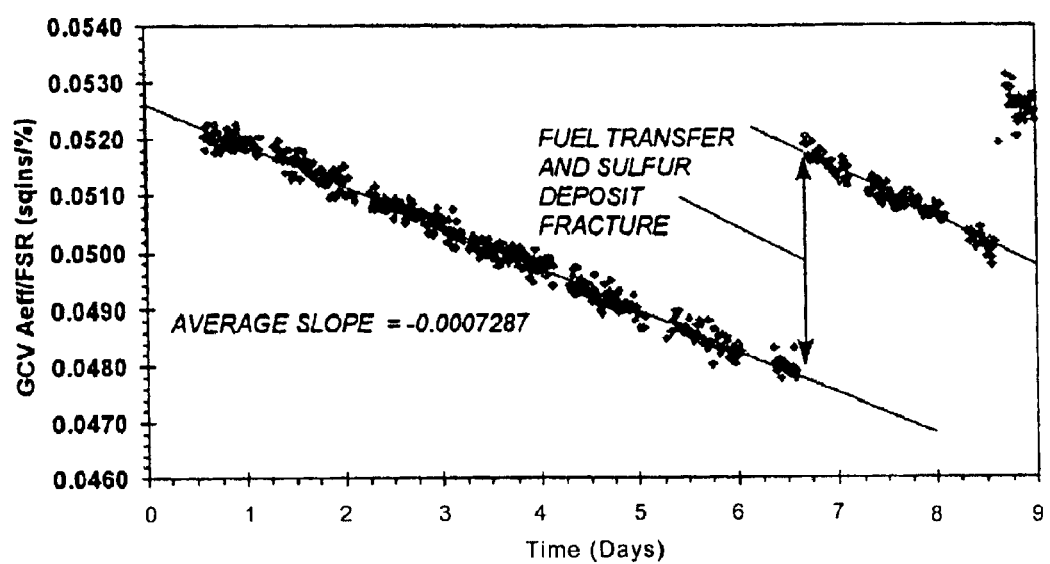
FIG. 1 is a chart showing nominal uncontrolled sulfur deposits forming at the throat of conventional GCV's.

All of the above figures are useful in understanding the control algorithm defined below.

DETAILED DESCRIPTION OF THE INVENTION

The present invention relies on two basic methodologies, both of which directly relate to the subject gas control algorithm. The two methods include a sulfur detection method and temperature control system.

The sulfur detection method used in accordance with the invention relies on the fact that the GCV's operate in the choked flow mode, that is, the pressure drop across the valves is such that the flow through the valves is proportional only to the upstream pressure, temperature, gas properties and effective valve area. A similar method can be used for non-critical valves, provided the upstream and downstream pressures are known.

The gas fuel specific heat ratio is determined from the measured gas fuel composition from which the choking pressure ratio is calculated. Given the choking pressure ratio, the upstream pressure and temperature and the gas mass flow rate, the GCV effective area can be accurately determined. The feedback control signal from the GCV's is measured by the gas turbine control system and expressed as a percent of full stroke. If the valve effective area and the position feedback are known, the area divided by the feedback position can be calculated.

Nominally, the GCV's response is linear over a wide range of operation (from 5% to 95%). In practical terms, this means that the effective area/feedback position ratio will remain constant over a broad range of operating conditions. If sulfur is deposited, the valve discharge coefficient changes and the ratio will decrease with time. Experience has shown that the rate of decline of the effective area/position feedback parameter should be measured over a minimum of about 2 to 3 days. For example, a deposit removal concentration of 20 ppbw at 37 pps (pounds per second) results in overall deposit rate of just over 1 ounce per day. In this example, the detection limit is about 2 to 3 ounces.

In accordance with the invention, the gas temperature control system can be linked to the calculation of the GCV effective area/position parameter. If the ratio is observed to be decreasing, the temperature can be increased above a nominal set point, and vice-versa if the ratio is increasing.

Other experimental observations have shown that the deposit mechanism is reversible. That is, raising the gas temperature prevents further deposition and existing deposits will be slowly removed at approximately the reverse of the deposition rate. Using a suitable control algorithm in accordance with the invention, a normal system operation can be maintained with only minor initial deposition, and sublimation periodically taking place.

Valve Effective Area Calculation

The valve effective area parameter is calculated using the procedure outlined below.

The specific heat ratio, k, is calculated from the measured gas composition using a mass-averaging technique.

For unchoked valve operation, the valve effective area is given by:

$$A_{eff} = W \times \frac{\sqrt{T}}{P_0} \times \frac{\left(\frac{P_o}{P_s}\right)^{\frac{(k+1)}{(2 \times k)}}}{\sqrt{\left(\left(\frac{P_o}{P_s}\right)^{\frac{k-1}{k}} - 1\right) \times \frac{2 \times k \times g}{((k-1) \times R)}}}$$

where:

$A_{eff}$ is the valve effective area in square inches;
W is the gas mass flow rate in pounds per second;
T is the gas absolute temperature in degrees Rankine;
$P_0$ is the gas upstream total pressure in psia;

$P_s$ is the gas valve throat static pressure in psia;
k is the gas specific heat ratio;
g is the acceleration due to gravity, 32.175 feet per second per second; and
R is the universal gas constant, 1545.34 foot-pounds force per pound-mole degrees Rankine.

For choked flow operation the critical pressure drop is calculated from:

$$P_{crit} = \left(1 + \left(\frac{k-1}{2}\right)\right)^{\frac{k}{(k-1)}}$$

Substituting the expression for $P_{crit}$ for pressure ratio in the above equation, the valve effective area is calculated from the equation:

$$A_{eff} = W \times \frac{\sqrt{T}}{P_0} \times \frac{(P_{crit})^{\frac{(k+1)}{2 \times k}}}{\sqrt{\frac{(k \times g)}{R}}}$$

The sulfur deposition parameter is then determined by:

$$S_{dep} = \frac{A_{eff}}{FSR}$$

where FSR is the gas control valve position feedback signal expressed as a percent of valve stroke.

For non-turbine applications, an equivalent valve stroke position signal can be used in place of FSR.

Examples of Controlled and Uncontrolled Sulfur Deposition

FIG. 1 below shows typical results from uncontrolled sulfur deposits forming at the throat of GCV's.

Figure 2:
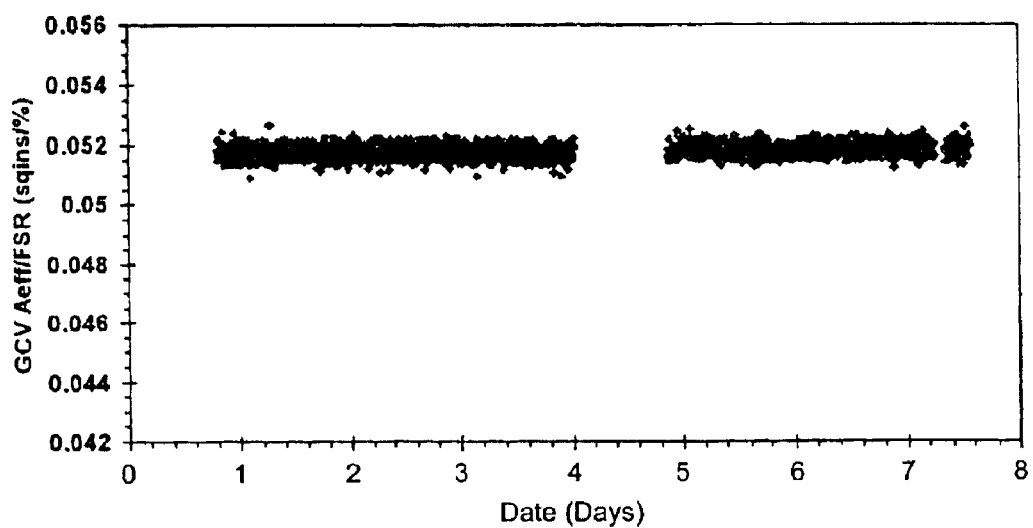
FIG. 2 shows the results of gas fuel heating on sulfur deposit formation in a typical gas turbine application.

FIG. 2 below shows the results of gas fuel heating on sulfur deposit formation. The sulfur deposit measurements indicate that no deposits were observed, verifying the effectiveness of fuel heating in eliminating the deposit using the subject control algorithm.

An example of a simple temperature control algorithm in accordance with the invention is shown below:

Where $T_s$ is the nominal temperature set point.

Sulfur deposits can be detected by maintaining, for example, a rolling two-day average of the sulfur deposition parameter, $S_{dep}$.

If $S_{dep}$ is negative, then a temperature correction can be applied equal to:

$$T_{err} = -S_{dep} \times 15000$$

A suitable limit on the correction of no more than 5 degrees F. can be applied to minimize any over correction. For the example shown in FIG. 1, the slope is −0.0007287. Thus, the correction would be +10.9 degrees F. Applying the maximum limit reduces the correction to +5 degrees F.

If $S_{dep}$ is zero or positive, then a suitable negative correction can be applied of −1 degree F.

The gas heater temperature will be controlled according to the following relationship:

$$T_{corr} = T_{set} + T_{err}$$

where $T_{corr}$ is the corrected control temperature.

It has been found that over a relatively short period of time, perhaps 1 to 2 weeks, the gas temperature control will stabilize and deposit-free operation will be maintained. The values shown above for the error correction are suggested initial values only. Field tuning of the constants may be required to maintain a more stable operation of the gas heater.

The selection of the initial set point can be estimated based on previous operating experience. For example, 10 to 15 degrees F above the current gas temperature is considered a reasonable starting point. The initial set point can also be determined analytically by reviewing the local gas processing system. A plot of the gas processing path can also be superimposed over a sulfur solubility map of concentration as a function of pressure and temperature, and an estimate made of the required temperature. An example of a sulfur deposition map used in carrying out the invention is shown in FIG. 3 below.

Figure 3:
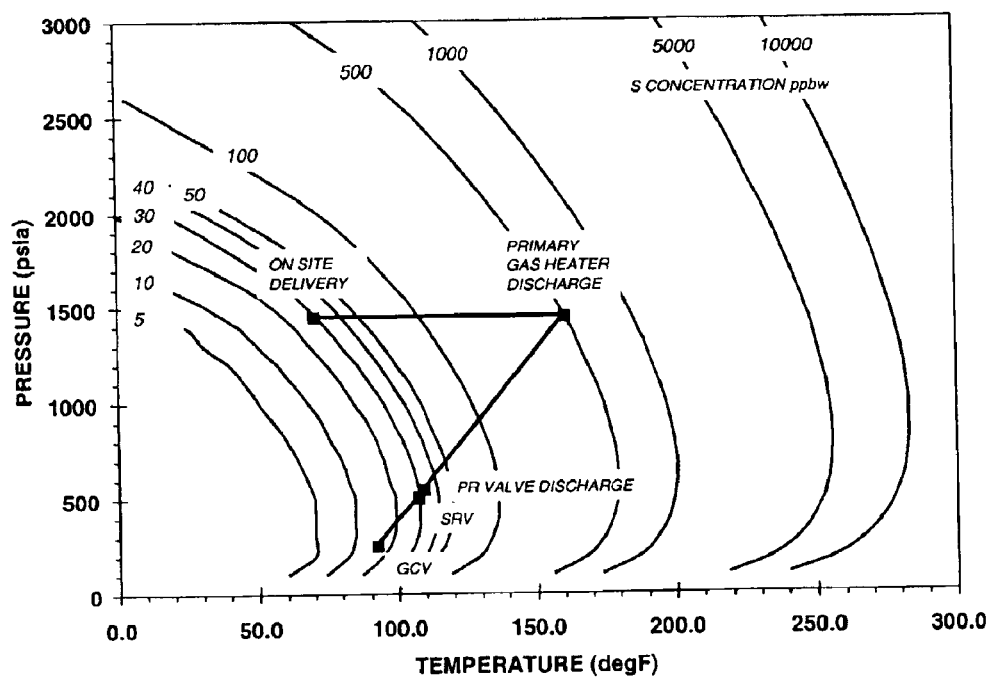
FIG. 3 shows the lines of constant sulfur solubility, i.e., a graphical depiction of the ability of gas to carry sulfur in the gas phase; the gas processing path from the on-site delivery point to the gas turbine control valve discharge point. A primary gas heater is used for superheat control that is not directly related to sulfur deposition control.

FIG. 3 shows lines of constant sulfur solubility in ppbw, that is, the ability of the gas to carry sulfur in the vapor phase. For the case shown above, gas is delivered in a sulfur-saturated condition with approximately 30 ppbw of sulfur being held in solution. The gas is heated and then expanded by a pressure reducing valve. No sulfur is deposited in this process as the solubility remains at or above 30 ppbw. As the gas passes through the SRV and GCV valves, the temperature drops during expansion and the solubility falls to approximately 15 ppbw at the discharge of the GCV.

A reduction in the sulfur solubility will result in the excess sulfur dropping out of solution and depositing as solid phase elemental sulfur.

Figure 4:
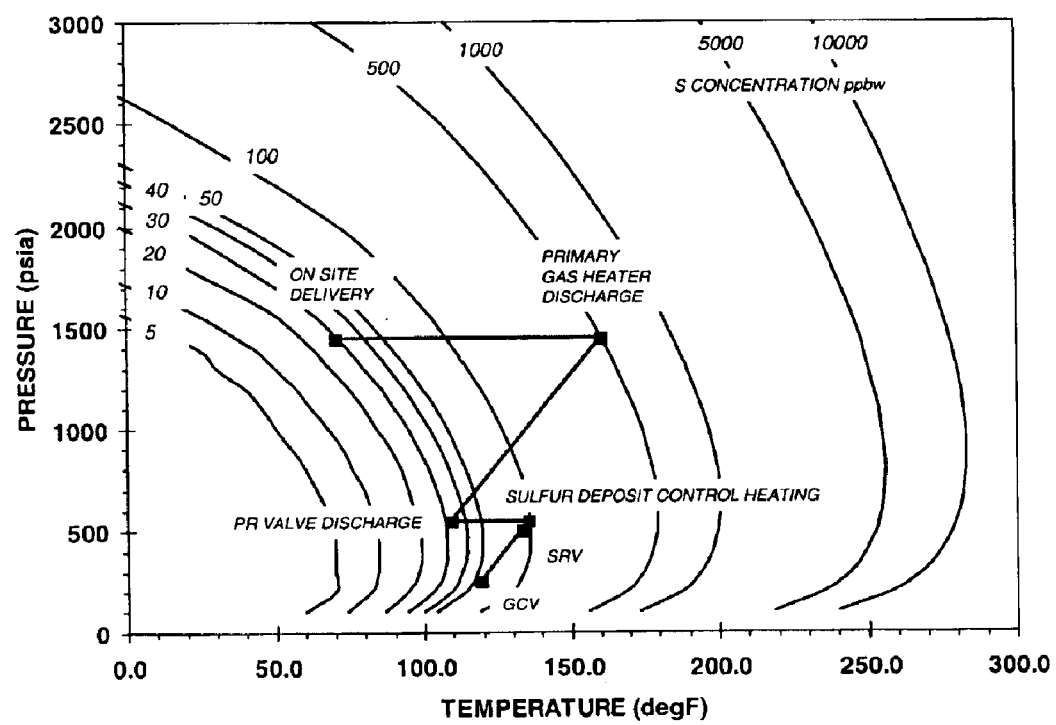
FIG. 4 shows the gas processing path with the sulfur deposition control heater in operation, located upstream of the SRV.

FIG. 4 below shows the gas processing path with a gas heater added just upstream of the SRV. In this case, the gas is heated to 135 degrees F. prior to expansion through the control valves. At the discharge of the GCV, the sulfur solubility is approximately 50 ppbw as a result of the elevated gas temperature. Since the solubility is now higher than the initial sulfur saturated gas conditions, sulfur deposit formations are avoided.

By performing an analysis similar to that shown above, the initial gas heater set point, in this case 135 degrees F., can be determined with reasonable accuracy.

The advantage of the new control algorithm described above is that it will automatically adjust to any changes made in the upstream gas processing system that may affect sulfur carry-over in the delivered gas. These processing changes are normally beyond the control of the local plant operator.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for controlling the amount of sulfur deposition in a gas fuel control valve for unchoked flow valve operation, comprising the steps of:

measuring (a) the gas flow rate through the control valve, (b) the gas temperature, (c) the gas pressure upstream of the control valve and (d) the static gas pressure downstream of the control valve;

calculating the effective valve area of the gas fuel control valve as determined by the equation:

$$A_{eff} = W \times \frac{\sqrt{T}}{P_0} \times \frac{\left(\frac{P_0}{P_s}\right)^{\frac{(k+1)}{(2\times k)}}}{\sqrt{\left[\left(\frac{P_0}{P_s}\right)^{\frac{k-1}{k}} - 1\right] \times \frac{2 \times k \times g}{((k-1) \times R)}}}$$

wherein:

$A_{eff}$ is the valve effective area in square inches;

W is the gas mass flow rate in pounds per second;

T is the gas absolute temperature in degrees Rankine;

$P_0$ is the gas upstream total pressure in psia;

$P_s$ is the gas valve throat static pressure in psia;

k is the gas specific heat ratio;

g is the acceleration due to gravity, 32.175 feet per second per second; and

R is the universal gas constant, 1545.34 foot-pounds force per pound-mole degrees Rankine.

determining a sulfur deposition feedback control parameter for the control valve based on a comparison of the effective valve area to a known valve position; and adjusting the gas temperature upstream of the control valve using the thus determined feedback control parameter.

2. A method according to claim 1, wherein said step of determining said sulfur deposition feedback control parameter is based on the amount of deposited sulfur as defined by the equation:

$$S_{dep} = \frac{A_{eff}}{FSR}$$

wherein FSR is a control valve position feedback signal in the form of a percent of valve stroke.

3. A method according to claim 2, further comprising the step of comparing the amount of said deposited sulfur over time to determine a rate of decline of the effective valve area.

4. A method according to claim 2, wherein an equivalent valve stroke position signal is used in place of FSR.

5. A method according to claim 1, further comprising the step of increasing the temperature of the gas above the sulfur solubility temperature to eliminate future sulfur deposits.

6. A method for detecting the amount of sulfur deposition in a gas fuel control valve for choked flow valve operation, comprising the steps of:

measuring (a) the gas flow rate through the control valve, (b) the gas temperature, (c) the gas pressure upstream of the control valve and (d) the static gas pressure downstream of the control valve;

calculating the effective valve area of the control valve as determined by the equation:

$$A_{eff} = W \times \frac{\sqrt{T}}{P_0} \times \frac{(P_{crit})^{\frac{(k+1)}{2 \times k}}}{\sqrt{\frac{(k \times g)}{R}}}$$

wherein, $P_{crit}$ is the critical pressure drop through the valve a calculated from the equation:

$$P_{crit} = \left(1 + \left(\frac{k-1}{2}\right)\right)^{\frac{k}{(k-1)}}$$

and wherein, $A_{eff}$ is the valve effective area in square inches;

W is the gas mass flow rate in pounds per second;

T is the gas absolute temperature in degrees Rankine;

$P_{crit}$ is the gas critical pressure ratio at the given gas temperature;

k is the gas specific heat ratio;

g is the acceleration due to gravity, 32.175 feet per second per second; and

R is the universal gas constant, 1545.34 foot-pounds force per pound-mole degrees Rankine.

* * * * *